United States Patent [19]

Flotow et al.

[11] Patent Number: 4,941,557
[45] Date of Patent: Jul. 17, 1990

[54] INTERMEDIATE PLATE POSITIONER MEANS FOR A FRICTION CLUTCH ASSEMBLY

[75] Inventors: Richard A. Flotow, Butler; Thomas G. Dickson, Fort Wayne, both of Ind.

[73] Assignee: Dana Corporation, Toledo, Ohio

[21] Appl. No.: 186,651

[22] Filed: Apr. 19, 1988

Related U.S. Application Data

[63] Continuation-in-part of Ser. No. 822,925, Jan. 24, 1986, abandoned, which is a continuation-in-part of Ser. No. 647,621, Sep. 5, 1984, abandoned.

[51] Int. Cl.⁵ .............................................. F16D 13/75
[52] U.S. Cl. ............................... 192/70.25; 192/111 A
[58] Field of Search ............. 192/70.25, 111 A, 70.18; 411/477, 479

[56] References Cited

U.S. PATENT DOCUMENTS

| | | |
|---|---|---|
| 2,366,594 | 1/1945 | Carlson . |
| 2,385,517 | 9/1945 | Hunt . |
| 2,674,863 | 4/1954 | Thelander ................ 192/106.2 X R |
| 2,737,843 | 3/1956 | Koehl ............................ 411/479 |
| 3,007,561 | 11/1961 | Harting ........................ 192/111 A |
| 3,061,062 | 10/1962 | Smirl ............................ 192/70.18 |
| 3,086,634 | 10/1959 | Reed ............................ 192/111 A |
| 3,232,160 | 2/1966 | Fork et al. ..................... 411/479 |
| 3,360,089 | 12/1967 | Cockerhill et al. ............. 192/111 A |
| 3,403,755 | 10/1968 | Barrett et al. ................. 192/111 A |
| 3,815,716 | 6/1974 | Harrington .................... 192/111 A |
| 3,990,803 | 11/1976 | Fischbach ..................... 411/479 X |
| 4,057,131 | 11/1977 | Flotow ......................... 192/70.13 |
| 4,086,995 | 5/1978 | Spokas ......................... 192/70.25 |
| 4,191,285 | 3/1980 | Thelander Sr. et al. ......... 192/111 A |
| 4,207,972 | 6/1980 | Zeidler ........................ 192/111 A |
| 4,257,502 | 3/1981 | Riese .......................... 192/70.25 |
| 4,339,023 | 7/1982 | Maycock ....................... 192/70.25 |
| 4,466,524 | 8/1984 | Lane ........................... 192/70.25 |
| 4,566,573 | 1/1986 | Lane ........................... 192/70.18 |
| 4,601,373 | 2/1986 | Despres et al. ............. 192/111 A X |
| 4,684,002 | 8/1987 | Takeuchi ...................... 192/70.25 |

FOREIGN PATENT DOCUMENTS

1576120  9/1969  France .
1205192  9/1970  United Kingdom .

Primary Examiner—Rodney H. Bonck
Attorney, Agent, or Firm—MacMillan, Sobanski & Todd

[57] ABSTRACT

An intermediate plate positioner device for a multiple disk friction clutch assembly is disclosed. A plurality of apertures are formed about the periphery of the intermediate plate. A positioner pin is inserted in each of the apertures extending between the flywheel and the cover of the clutch assembly. Each positioner pin is sized relative to its respective aperture so as to provide an interference fit therebetween. The force required to axially slide each positioner pin through its respective aperture is predetermined to be less than the force generated by clutch springs, which urge the clutch assembly toward an engaged position, but greater than the force exerted by the drive straps of the clutch assembly, which urge the intermediate plate toward a disengaged position. As the friction faces of the clutch assembly wear thinner during use, the position of the intermediate plate relative to the clutch cover in the disengaged position is varied by engagement of the positioner pins with the flywheel clutch cover.

6 Claims, 4 Drawing Sheets

INTERMEDIATE PLATE POSITIONER MEANS FOR A FRICTION CLUTCH ASSEMBLY

CROSS REFERENCE TO RELATED APPLICATION

This application is a continuation-in-part of application Ser. No. 06/822,925, filed Jan. 24, 1986, now abandoned, which was a continuation-in-part of application Ser. No. 06/647,621, filed Sept. 5, 1984, now abandoned.

BACKGROUND OF THE INVENTION

The present invention relates in general to clutch assemblies for vehicles and in particular to an intermediate plate positioner means for a multiple disk friction clutch assembly.

A friction clutch assembly is typically utilized to connect a vehicle engine to a transmission or power take-off assembly. The clutch assembly is usually enclosed in a bell-shaped housing which is secured to the engine block. The bell-shaped housing also encloses a flywheel which is attached to the output end of an engine crankshaft for rotation therewith. The flywheel has a driving surface which can be frictionally engaged by an axially movable clutch disk. The clutch disk is splined onto an output shaft connected to a set of gears in the transmission. An axially movable pressure plate is normally urged against the clutch disk by a plurality of springs acting against a clutch cover attached to the flywheel. When the clutch assembly is engaged, the clutch disk is frictionally retained between the pressure plate and the flywheel such that the rotational movement of the engine is transmitted therethrough to the output shaft.

The torque transmitting capability of the above-described single disk clutch assembly may be increased by adding one or more additional clutch disks thereto. It is well known to provide two such clutch disks on the output shaft and a single intermediate driving plate disposed therebetween. Drive straps can be utilized to connect the clutch cover to both the pressure plate and the intermediate plate for rotation with the flywheel. When the clutch assembly is disengaged, the drive straps pull the pressure plate and the intermediate plate out of frictional engagement with the clutch disks. As the friction faces of the clutch assembly wear thinner during use, the lengths of travel of the components of the clutch assembly between the engaged and disengaged positions increase somewhat. However, the drive straps tend to urge the intermediate plate toward its original position relative to the clutch cover, regardless of the amount of change in the lengths of travel of the components of the clutch assembly. Such inflexible positioning of the intermediate plate may cause undesirable interaction with one of the clutch disks when the clutch assembly is disengaged. Thus, it would be advantageous to provide a means for adjusting the position of the intermediate plate relative to the pressure plate and clutch cover as the components of the clutch assembly wear thinner.

SUMMARY OF THE INVENTION

The present invention relates to an intermediate plate positioner means for a multiple disk friction clutch assembly. A plurality of apertures are formed about the periphery of the intermediate plate. A positioner pin is inserted in each of the apertures extending between the flywheel and the cover of the clutch assembly. Each positioner pin is sized relative to its respective aperture so as to provide an interference fit therebetween. The force required to axially slide each positioner pin through its respective aperture is predetermined to be less than the force generated by clutch springs, which urge the clutch assembly toward an engaged position, but greater than the force exerted by the drive straps of the clutch assembly, which urge the intermediate plate toward a disengaged position. As the friction faces of the clutch assembly wear thinner during use, the position of the intermediate plate relative to the pressure plate and the clutch cover in the disengaged position is varied by engagement of the positioner pins with the flywheel and the clutch cover. The positioner pins can be formed in the shape of a hollow cylinder having a slot formed longitudinally therethrough so as to provide a generally C-shaped cross section.

It is an object of the present invention to provide an improved multiple disk friction clutch assembly for a vehicle.

It is another object of the present invention to provide such an improved clutch assembly wherein the position of the intermediate plate relative to the other components of the clutch assembly in the disengaged position is varied in accordance with the amount of wear of such components.

It is a further object of the present invention to provide such an intermediate plate positioning means for a clutch assembly which is simple and inexpensive in construction.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
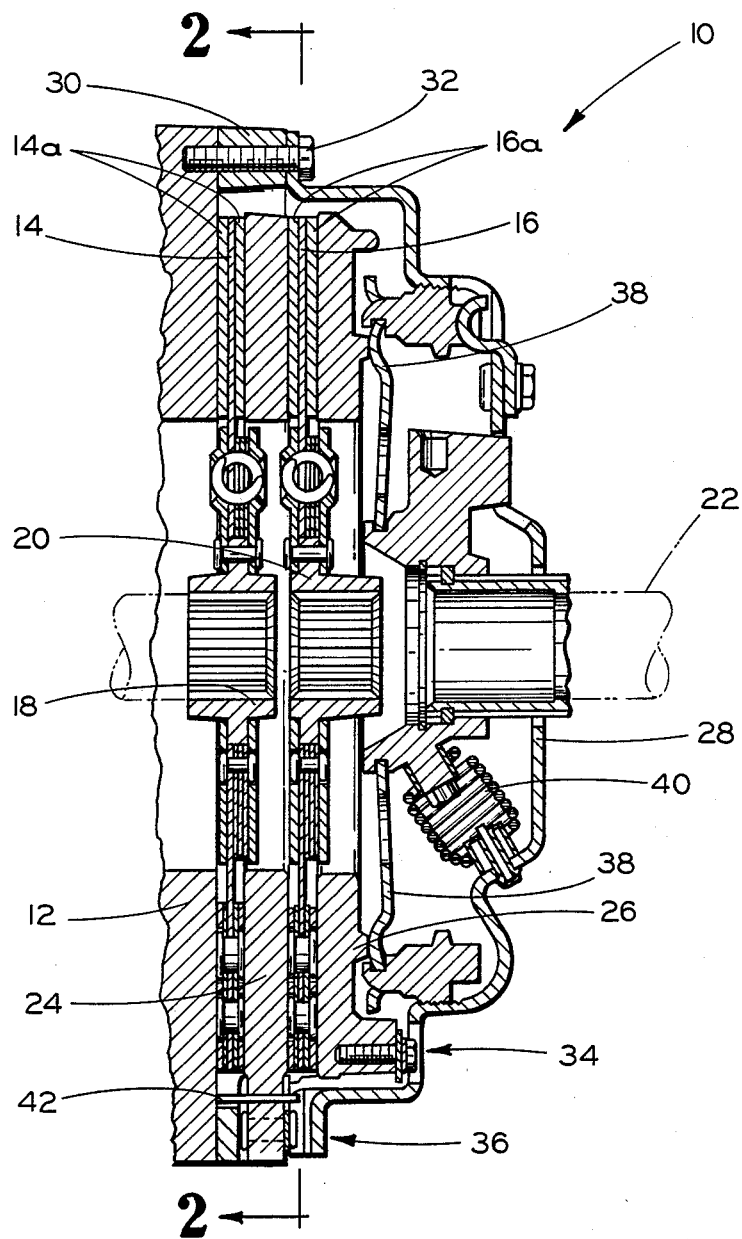
FIG. 1 is a sectional elevational view of a multiple disk friction clutch assembly including an intermediate plate positioner means in accordance with the present invention, shown in an engaged position with a flywheel.

Referring now to the drawings, there is illustrated in FIG. 1 a sectional elevational view of a multiple disk friction clutch assembly, indicated generally at 10. The clutch assembly 10 is illustrated as being mounted adjacent a flywheel 12 connected to a crankshaft (not shown) of a vehicle engine in a known manner, such that rotational movement of the crankshaft by the vehicle engine is transmitted to the flywheel 12. The clutch assembly 10 includes forward and rearward annular clutch disks 14 and 16, respectively. Each of the clutch disks 14 and 16 includes a pair of friction facings 14a and 16a, respectively attached to the opposing faces thereof. The clutch disks 14 and 16 are connected to respective hub members 18 and 20 for rotation therewith. The hubs 18 and 20 are splined onto an output shaft 22 (shown in phantom) and are axially movable thereon. The output shaft 22 is typically piloted at its forward end in a bearing (not shown) retained in the flywheel 12 and can be connected at its rearward end to a set of gears (not shown) in a transmission.

Figure 2:
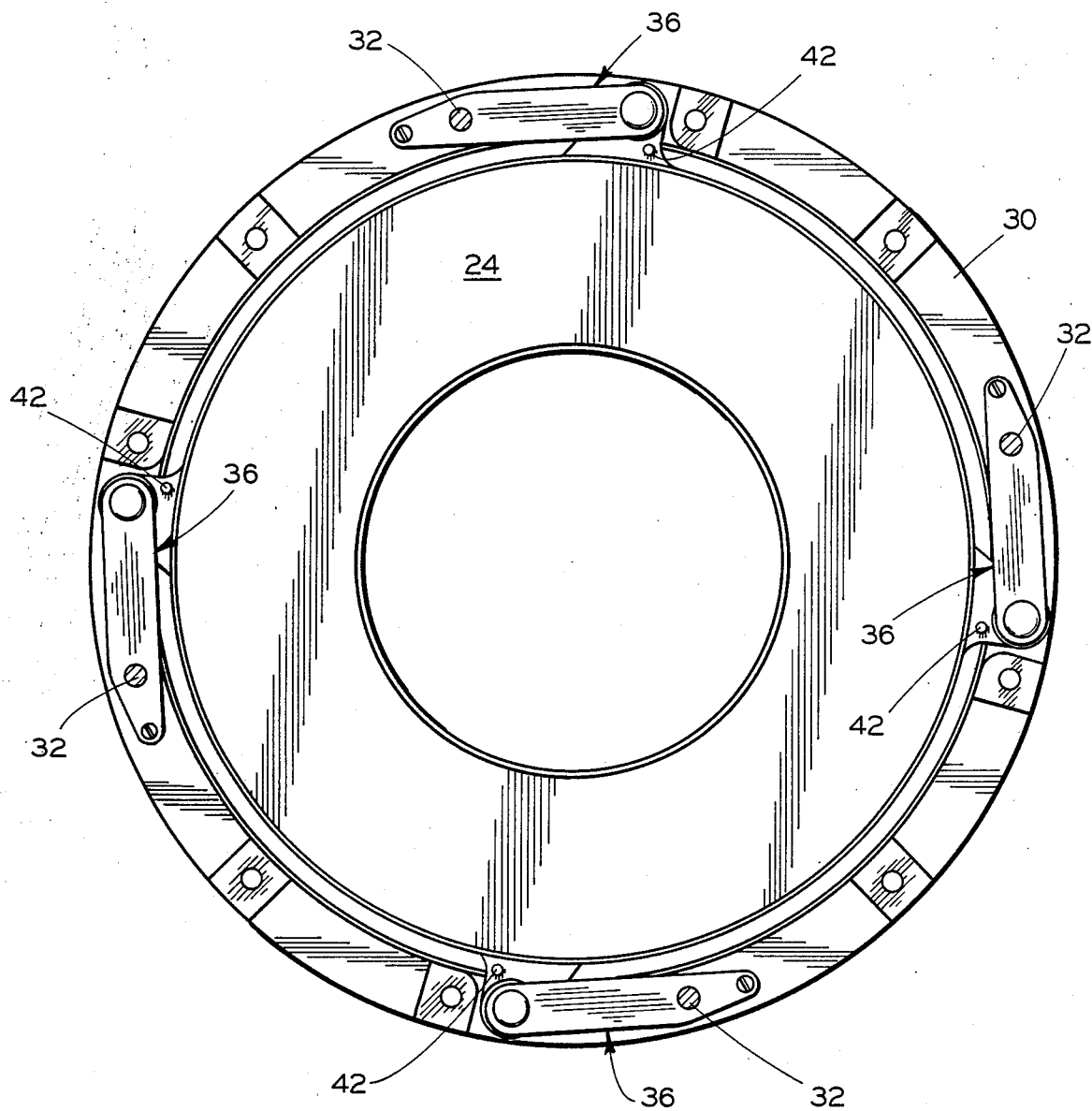
FIG. 2 is a sectional elevational view taken along line 2—2 of FIG. 1 showing the intermediate plate and the spacer ring of the clutch assembly.

An intermediate plate 24 and a pressure plate 26 are rotatably and coaxially disposed about the output shaft 22. The intermediate plate 24 is disposed between the forward and rearward clutch disks 14 and 16, respectively, while the pressure plate 26 is disposed rearwardly of the rearward clutch disk 16. A clutch cover 28 is attached to the flywheel 12 through an adapter or spacer ring 30 by a plurality of threaded fasteners 32 (see FIG. 2) or any other suitable means. The spacer ring 30 provides a convenient means for transforming a single disk clutch assembly into a multiple disk clutch assembly, as described and illustrated in U.S. Pat. No. 4,057,131 (assigned to the assignee of the present invention). A first plurality of drive strap assemblies, each indicated generally at 34, is provided to connect the cover 28 to the pressure plate 26 for rotation therewith. Similarly, a second plurality of drive strap assemblies, each indicated generally at 36, is provided to connect the cover 28 to the intermediate plate 24 for rotation therewith. The structure and operation of the drive strap assemblies 34 and 36 are explained and illustrated in co-pending U.S. Pat. Application Ser. No. 449,961, filed Dec. 15, 1982 (assigned to the assignee of the present application), now U.S. Pat. No. 4,566,573, issued Jan. 28, 1986, the disclosure of which is hereby incorporated by reference. Thus, it can be seen that the flywheel 12, the spacer ring 30, the cover 28, the pressure plate 26, and the intermediate plate 24 all rotate together as a unit, while the forward and rearward clutch disks 14 and 16 and the output shaft 22 all rotate together as an interacting but separate unit.

A plurality of clutch levers 38 are circumferentially spaced about the output shaft 22 to provide, in a known manner, a means for selective engagement and disengagement of the forward and rearward disks 14 and 16 by the flywheel 12, the intermediate plate 24, and the pressure plate 26. A plurality of return springs 40 (only one is illustrated) cooperate with a throw-out bearing (not shown) in a conventional manner to provide for such engaging and disengaging movements of the clutch levers 38, as will be appreciated by those skilled in the art. As utilized herein, movement toward the engaged position is considered to be forward movement in the clutch assembly 10, while movement toward the disengaged position is considered to be rearward movement in the clutch assembly 10.

A plurality of generally cylindrical positioner pins 42 are provided about the periphery of the intermediate ring 24. Each of the positioner pins 42 extends through an aperture 24a (see FIGS. 3 and 4) formed in the periphery of the intermediate plate 24 between the flywheel 12 and a flat radially-extending portion 28a formed in the periphery of the cover 28. The positioner pins 42 are preferably formed with a rolled exterior surface, but can alternatively be formed with a knurled or other exterior surface, so long as axial movement through the apertures 24a is permitted. The positioner pins 42 are each sized relative to their respective apertures 24a so as to provide an interference fit therebetween. As will be explained in greater detail below, the positioner pins 42 are each axially movable throughout the respective apertures 24a when a force is applied thereto having a magnitude which exceeds the frictional resistance generated by the interference fit.

In operation, the return springs 40 normally urge the pressure plate 26 forwardly such that the forward and rearward clutch disks 14 and 16 are frictionally engaged by (and, consequently, rotate with) the flywheel 12, the intermediate plate 24, and the pressure plate 26 in a known manner. The forwardly-directed force exerted by the return springs 40 is relatively large, typically about two thousand eight hundred pounds, so as to insure a firm frictional engagement between the above-identified components of the clutch assembly 10. When it is desired to disengage the clutch assembly, a force is applied to the throw-out bearing (not shown) which is greater than the force exerted by the return springs 40 so as to pivot the clutch levers 38 and permit the pressure plate 26 to move rearwardly in a known manner. The first drive strap assemblies 34, which are connected between the pressure plate 26 and the cover 28, exert a force against the pressure plate 26 urging it rearwardly from the engaged position to a predetermined spaced apart distance relative to the cover 28. Thus, when the force exerted by the return springs 40 is overcome, the first drive strap assemblies 34 pull the pressure plate 26 rearwardly out of frictional engagement with the rearward clutch disk 16. Similarly, the second drive strap assemblies 36 also exert a force against the intermediate plate 24 urging it rearwardly from the engaged position to a predetermined spaced apart distance relative to the cover 28 and, consequently, the pressure plate 26. The force exerted by the second drive strap assemblies 36 is relatively small, typically about two hundred pounds. When the pressure plate 26 is moved rearwardly out of frictional engagement with the rearward clutch disk 16 during the disengagement of the clutch assembly 10, the second drive strap assemblies 36 pull the intermediate plate 24 rearwardly out of frictional engagement with the forward clutch disk 14.

The length of travel of the pressure plate 26 between the engaged and disengaged positions is a predetermined distance, typically around 0.060 inches. The length of travel of the intermediate plate 24 between the engaged and disengaged positions is a distance which is preferably one-half of the length of travel of the pressure plate 26, or about 0.030 inches. It is desirable to position the intermediate plate 24 exactly half way between the pressure plate 26 and the flywheel 12 in the disengaged position so as to avoid any unwanted interference between the intermediate plate 24 and either of the forward or rearward clutch disks 14 and 16. In order to achieve this when the clutch assembly 10 is new, the second drive strap assemblies 36 are formed to urge the intermediate plate 24 toward a position which is spaced apart from the pressure plate 26 by a predetermined amount (as mentioned above, typically 0.030 inches) when the clutch assembly 10 is in the disengaged position.

As the clutch assembly 10 is utilized repeatedly over long periods of time, the friction facings 14a and 16a of the forward and rearward clutch disks 14 and 16, as well as other components of the clutch assembly, begin to wear thinner. As such wear occurs, the length of travel of the pressure plate 26 between the engaged and disengaged positions increases. However, the second drive strap assemblies 36 continue to normally return the intermediate plate 24 to the same spaced apart distance relative to the pressure plate 26 as when the clutch assembly 10 was new. Thus, as the effects of wear continue, the intermediate plate 24 is positioned increasingly further from the desired half way distance between the flywheel 12 and the pressure plate 26 in the disengaged position. To correct this situation, the positioner pins 42 are provided to vary the distance by which the intermediate plate 24 is spaced apart from the pressure plate 26 in the disengaged position as wear occurs in the clutch assembly 10.

As previously mentioned, the positioner pins 42 are axially movable within the apertures 24a formed in the intermediate plate 24, but only when a force of sufficient magnitude is applied thereto which is greater than the frictional resistance of the interference fit. The present invention contemplates that the force required to overcome this frictional resistance be greater than the relatively small force exerted by the second drive strap assemblies 36, which normally urge the intermediate plate 24 rearwardly toward the cover 28, but less than the relatively large force exerted by the return springs 40, which normally urge the pressure plate 26 and intermediate plate 24 forwardly toward the flywheel 12. It has been found desirable to size the positioner pins 42 relative to the apertures 24a formed in the intermediate plate 24 so as to require a force of approximately one thousand pounds to overcome the combined frictional resistance of the interference fits and axially move the positioner pins 42 within the apertures 24a. This amount of force is clearly larger than the two hundred pound force exerted by the second drive strap assemblies 36, but less than the two thousand eight hundred pound force exerted by the return springs 40.

Figures 3, 4:
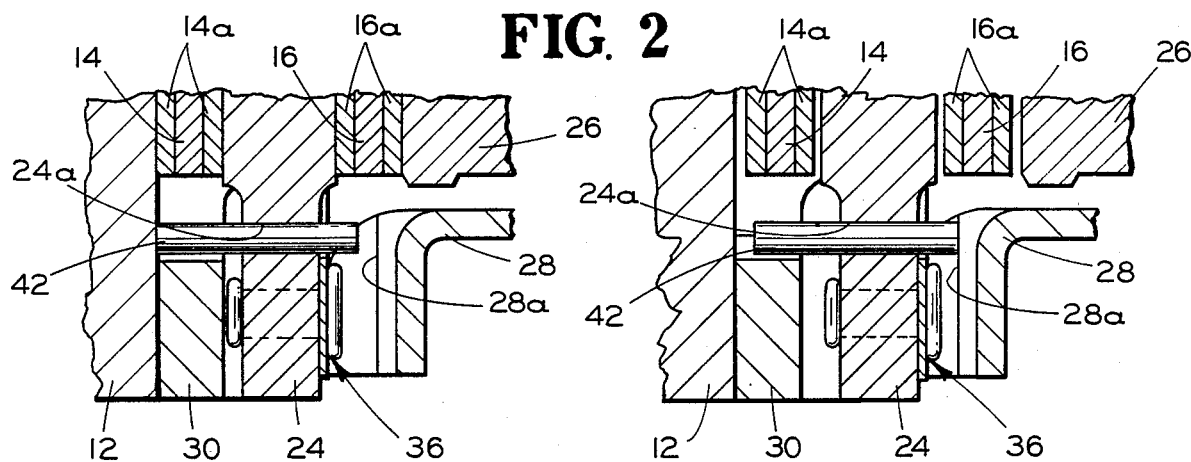
FIG. 3 is an enlarged view of the intermediate plate positioner means of FIG. 1 showing the clutch assembly in an engaged position.
FIG. 4 is an enlarged view of the intermediate plate positioner means of FIG. 1 showing the clutch assembly in a disengaged position.
Figure 5:
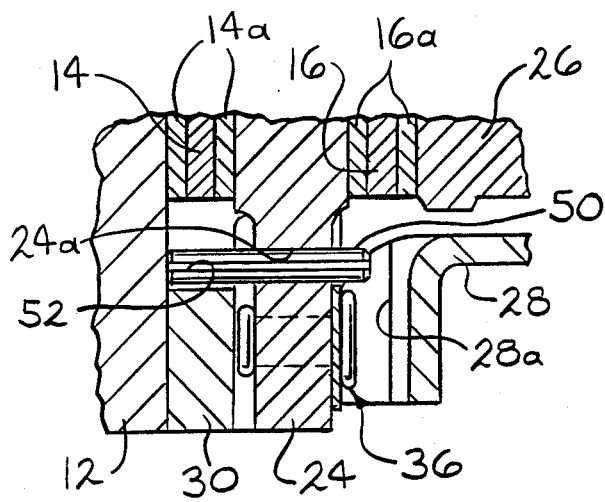
FIG. 5 is an enlarged view of the intermediate plate positioner means similar to FIG. 3 illustrating an alternate embodiment of the positioner pin in an engaged position.
Figure 6:
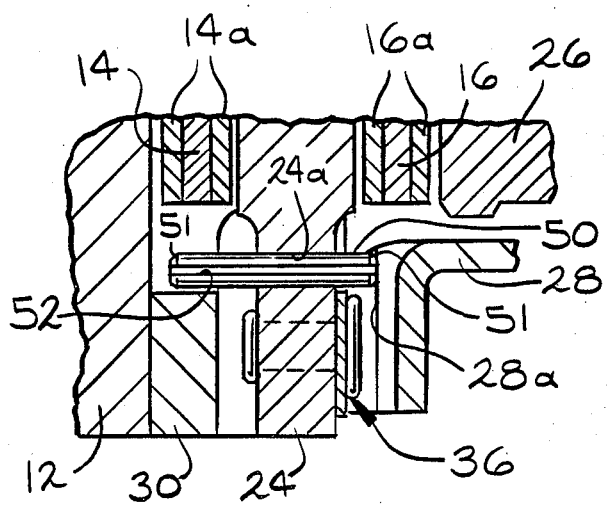
FIG. 6 is an enlarged view of the intermediate plate positioner means similar to FIG. 4 illustrating the alternate embodiment of the positioner pin in a disengaged position.
Figure 7:
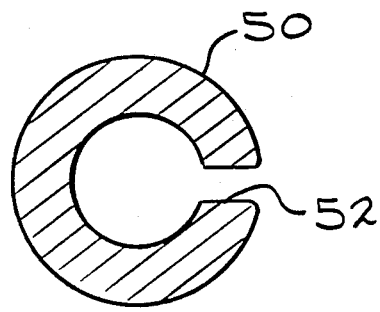
FIG. 7 is a sectional elevational view taken along line 7—7 of FIG. 8.
Figure 8:
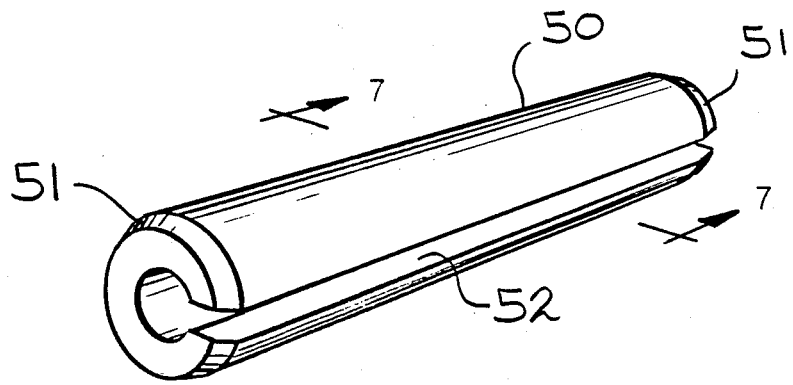
FIG. 8 is a perspective view of the alternate embodiment of the positioner pin.

Referring now to FIGS. 3 and 4, the operation of the positioner pins 42 will be explained in detail. When the clutch assembly 10 is moved to the engaged position shown in FIG. 3, the forward ends of the positioner pins 42 abut the rearward surface of the flywheel 12. As the friction faces 14a of the forward clutch disk 14 wear thinner during use, the intermediate plate 24 will be moved forwardly along the positioner pins 42 toward the flywheel 12 because the relatively large force exerted by the return springs 40 urging the intermediate plate 24 forward is greater than the frictional resistance of the positioner pins 42 in the apertures 24a tending to resist such movement. Thus, the position of the intermediate plate 24 is adjusted relative to the positioner pins 42 as wear occurs in the clutch assembly 10.

When the clutch assembly 10 is moved to the disengaged position shown in FIG. 4 following the above-described adjustment, the rearward ends of the positioner pins 42 initially engage the flat portion 28a of the cover 28. Since the intermediate plate 24 has been moved forwardly with respect to the positioner pins 42, the second drive strap assemblies 36 continue to urge the intermediate plate 24 rearwardly toward its original position relative to the pressure plate 26. However, the relatively small force exerted by the second drive strap assemblies 36 is insufficient to overcome the frictional resistance of the interference fit between the positioner pins 42 in the apertures 24a tending to resist such movement. Accordingly, the intermediate plate 24 is prevented from moving further and, instead, is maintained at a spaced apart distance from the pressure plate 26 which is greater than the original spaced apart distance As the components of the clutch assembly 10 continue to wear thinner, it can be seen that the distance at which the intermediate plate 24 is spaced apart from the pressure plate 26 by the positioner pin 42 will increase.

Referring now to FIGS. 5 through 8, an alternate embodiment of the positioner pins 42 is illustrated. As shown therein, a plurality of modified positioner pins 50 (only one is illustrated) are each formed generally in the shape of a hollow cylinder. The modified positioner pin 50 is maintained in the aperture 24a as described above. Both ends of the positioner pin 50 are chamfered, as indicated at 51, to facilitate the insertion of the modified pin 50 within the aperture 24a. A slot 52 is formed through the modified pin 50 extending completely longitudinally therethrough. Thus, as most clearly in seen in FIGS. 7 and 8, the modified positioner pin 50 has a generally C-shaped cross section. The outer diameter of the modified pin 50 is formed slightly larger than the diameter of the aperture 24a such that the above-described frictional fit is maintained therebetween. The modified positioner pin 50 is therefore compressed like a spring when inserted within the aperture 24a.

The modified positioner pin 50 is preferable to the solid cylindrical or knurled pin 42 described above because it is less affected by uneven changes in temperature of the components of the clutch assembly 10 and the consequent expansion and contraction thereof. Specifically, it has been found that the intermediate plate 24 heats up at a faster rate than the positioner pins 24 or 50 during use because of the frictional engagement of the intermediate plate 24 with the friction facings 14a and 16a of the clutch discs 14 and 16, respectively. The positioner pins 42 or 50 also increase in temperature by virtue of their contact with the intermediate plate 24, cut such increase in temperature is relatively slow and lags behind the relatively rapid increase in temperature of the intermediate plate 24. As the intermediate plate 24 heats up, the diameter of the aperture 24a increases. The solid cylindrical or knurled pin 42 also expands, but at a slower rate than the diameter of the aperture 24a. Thus, the friction between the solid positioner pin 42 and the intermediate plate 24 is decreased, thus changing the amount of force required to axially move the solid position pin 42 through the aperture 24a.

The modified positioner pin 50 is less affected by the above-described changes in temperature of the intermediate 24 because it acts like a spring compressed within the aperture 24a. As the diameter of the aperture 24a increases, the modified positioner pin 50 expands outwardly to remain in contact therewith. Since the change in diameter of the aperture 24a is relatively small with respect to the diameter of the modified positioner pin 50, the force exerted by the modified positioner pin 50 against the aperture 24 a remains relatively constant during temperature expansion. By varying the type of material utilized to form the modified positioner pin 50 and the diameter and thickness thereof, the force required to move the modified positioner pin 50 through the aperture 24a can be varied.

Several other advantageous features are achieved through the use of the resilient modified positioner pin 50. First, the tolerances required in forming the apertures 24a and the modified positioner pin 50 are less critical than would be required with the solid positioner pins 42. Second, the force required to overcome the friction between the modified positioner pin 50 and the intermediate plate 24 is less dependent upon wear and degradation than would the use of the solid cylindrical pin 42 in the aperture 24a. As a result, a more reliable positioning means is provided at a lesser cost.

Figure 9:
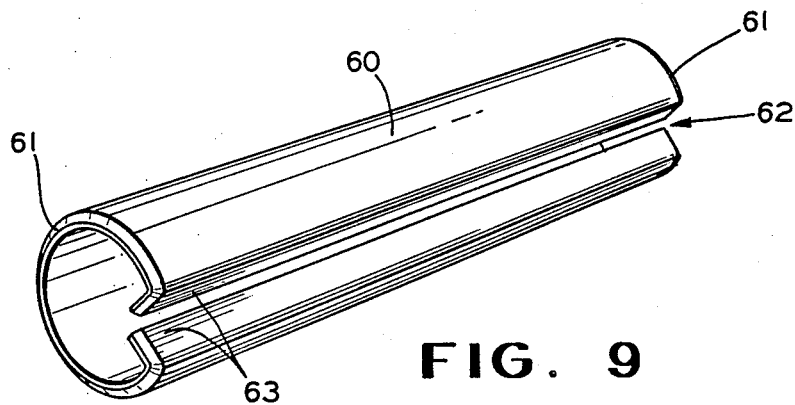
FIG. 9 is a perspective view of a second alternate embodiment of the positioner pin.
Figure 10:
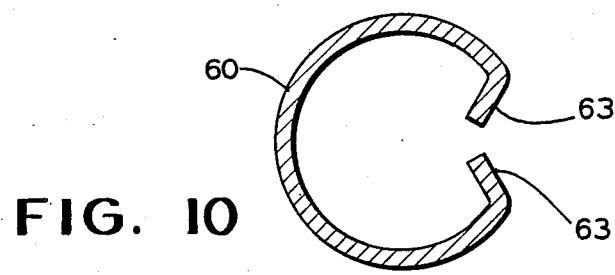
FIG. 10 is a sectional elevational view taken through the center of the positioner pin illustrated in FIG. 9.

Referring now to FIGS. 9 and 10, a second alternate embodiment of a positioner pin 60 is illustrated. As shown therein, the positioner pin 60 is hollow and cylindrical in shape. Both ends of the pin 60 are chamfered, as shown at 61. A longitudinal slot, indicated generally at 62, is formed completely through the pin 60, defining a pair of adjacent longitudinally extending side portions. Thus, the pin 60 has a generally C-shaped cross section. A flange 63 is formed along each of the longitudinally extending side portions of the pin 60. As best shown in FIG. 10, the flanges 63 extend radially inwardly from the side portions of the pins 60, thereby defining right angles with the adjacent side portions. As with the positioner pin 50, the pin 60 has a completely hollow interior (except for the flanges 63).

A plurality of the positioner pins 60 are adapted to be disposed within the apertures 24a formed through the intermediate plate 24 as described above. The pins 60 function substantially the same as the positioner pins 42 and 50. However, by providing the flanges 63 on the pins 60, the pins 60 operate in a preferred manner than the pins 50, which do not includes such flanges 63. Specifically, it has been found that the pins 60 tend to exert a more constant force against the apertures 24a than the pins 50 as the ambient conditions (such as temperature) vary within the clutch 10. The pins 60 tend to avoid assuming a set position or shape, which would cause the frictional force between them and the intermediate plate 24 to change with such ambient conditions. Consequently, the force required to move the pins 60 through the apertures 24is more constant as conditions change than the pins 50.

Figure 11:
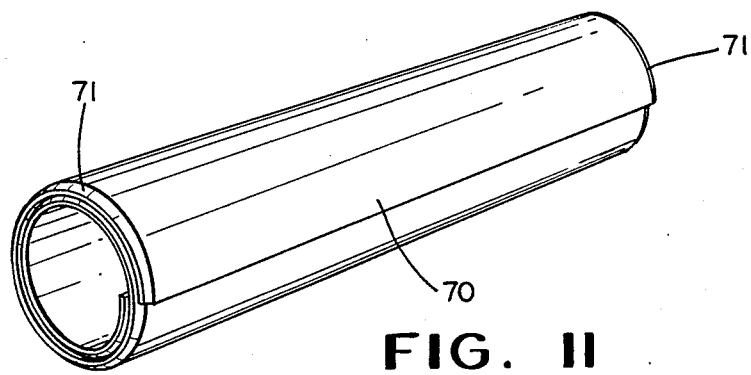
FIG. 11 is a perspective view of a third alternate embodiment of the positioner pin.
Figure 12:
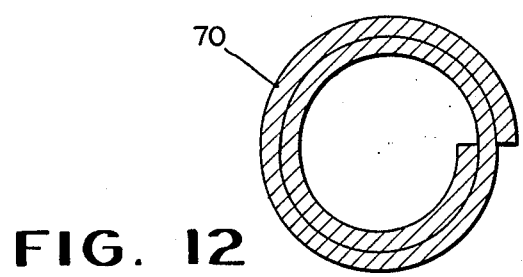
FIG. 12 is a sectional elevational view taken through the center of the positioner pin illustrated in FIG. 11.

Referring now to FIGS. 11 and 12, a third alternate embodiment of a positioner pin 70 is illustrated. As shown therein, the positioner pin 70 is a coiled metal spring, which is wrapped about itself in overlapping fashion. Thus, the pin 70 is generally hollow and cylindrical in shape. Both ends of the pin 70 are chamfered, as shown at 71. A plurality of the positioner pins 70 are adapted to be disposed within the apertures 24a formed through the intermediate plate 24 as described above. The pins 70 function substantially the same as the positioner pins 42, 50, and 60.

In accordance with the provisions of the patent statutes, the principal and mode of operation of the present invention has been explained and illustrated in its preferred embodiment. However, it must be understood that the present invention can be practiced otherwise than as specifically explained and illustrated without departing from its spirit or scope.

What is claimed is:

1. A friction clutch for selectively connecting an input shaft to an output shaft for rotation therewith comprising:
   a flywheel attached to the input shaft for rotation therewith;
   a cover attached to said flywheel for rotation therewith;
   a pressure plate disposed between said flywheel and said cover, said pressure plate being connected to said cover for rotation therewith and being axially movable relative thereto between engaged and released positions;
   an intermediate plate disposed between said flywheel and said pressure plate;
   means for connecting said intermediate plate to said cover for rotation therewith, said connecting means permitting axial movement of said intermediate plate between engaged and released positions and exerting a relatively small force urging said intermediate plate toward said cover;
   first and second axially movable clutch disks connected to the output shaft for rotation therewith, said first clutch disk being disposed between said flywheel and said intermediate plate and said second clutch disk being disposed between said intermediate plate and said pressure plate, said clutch disks including friction facing material having an initial thickness which is decreased as wear occurs thereto;
   means for selectively exerting a relatively large force against said pressure plate to axially move said pressure plate toward said engaged position such that said clutch disks are frictionally engaged between said pressure plate, said intermediate plate, and said flywheel to connect the input shaft to the output shaft for rotation therewith; and
   a positioner pin extending through an aperture formed in said intermediate plate having a first end adjacent said flywheel and a second end adjacent said cover, said positioner pin being maintained in said aperture in an interference fit with said intermediate plate and having a frictional resistance to movement through said aperture which is greater than said relatively small force and less than said relatively large force, said first end of said positioner pin abutting said flywheel when said clutch is engaged and said second end of said positioner pin abutting said cover when said clutch is disengaged, said positioner pin being shaped in the form of a hollow cylinder having a longitudinal slot formed therethrough defining longitudinally extending side portions, an inwardly extending flange being formed along each of said side portions, said flange portions being spaced apart from one another when said positioner pin is disposed within said aperture.

2. The invention defined in claim 1 wherein a plurality of said positioner pins are provided in a respective plurality of apertures formed through said intermediate plate.

3. The invention defined in claim 1 wherein said positioner pins is chamfered at both ends thereof.

4. A friction clutch for selectively connecting an input shaft to an output shaft for rotation therewith comprising:

- a flywheel attached to the input shaft for rotation therewith;
- a cover attached to said flywheel for rotation therewith;
- a pressure plate disposed between said flywheel and said cover, said pressure plate being connected to said cover for rotation therewith and being axially movable relative thereto between engaged and released positions;
- an intermediate plate disposed between said flywheel and said pressure plate;
- means for connecting said intermediate plate to said cover for rotation therewith, said connecting means permitting axial movement of said intermediate plate between engaged and released positions and exerting a relatively small force urging said intermediate plate toward said cover;
- first and second axially movable clutch disks connected to the output shaft for rotation therewith, said first clutch disk being disposed between said flywheel and said intermediate plate and said second clutch disk being disposed between said intermediate plate and said pressure plate, said clutch disks including friction facing material having an initial thickness which is decreased as wear occurs thereto;
- means for selectively exerting a relatively large force against said pressure plate to axially move said pressure plate toward said engaged position such that said clutch disks are frictionally engaged between said pressure plate, said intermediate plate, and said flywheel to connect the input shaft to the output shaft for rotation therewith; and
- a positioner pin extending through an aperture formed in said intermediate plate having a first end adjacent said flywheel and a second end adjacent said cover, said positioner pin being maintained in said aperture in an interference fit with said intermediate plate and having a frictional resistance to movement through said aperture which is greater than said relatively small force and less than said relatively large force, said first end of said positioner pin abutting said flywheel when said clutch is engaged and said second end of said positioner pin abutting said cover when said clutch is disengaged, said positioner pin being shaped in the form of a coiled spring wrapped about itself in overlapping fashion.

5. The invention defined in claim 4 wherein a plurality of said positioner pins are provided in a respective plurality of apertures formed through said intermediate plate.

6. The invention defined in claim 4 wherein said positioner pins is chamfered at both ends thereof.

* * * * *

UNITED STATES PATENT AND TRADEMARK OFFICE
CERTIFICATE OF CORRECTION

PATENT NO. : 4,941,557

DATED : JULY 17, 1990

INVENTOR(S) : RICHARD A. FLOTOW, THOMAS G. DICKSON AND MARTIN E. KUMMER

It is certified that error appears in the above-identified patent and that said Letters Patent is hereby corrected as shown below:

ON TITLE PAGE: [75] Inventors: "Richard A. Flotow, Butler; Thomas G. Dickson, Fort Wayne, both of Ind." should be changed to -- Richard A. Flotow, Butler; Thomas G. Dickson, Fort Wayne; and Martin E. Kummer, Auburn, all of Ind. --

Signed and Sealed this

Fifth Day of November, 1991

Attest:

HARRY F. MANBECK, JR.

Attesting Officer

Commissioner of Patents and Trademarks